(12) United States Patent
Takahashi et al.

(10) Patent No.: US 7,735,906 B2
(45) Date of Patent: Jun. 15, 2010

(54) REINFORCEMENT SYSTEM FOR AN AUTOMOTIVE VEHICLE

(75) Inventors: Ken Takahashi, Bloomfield, MI (US); Alex Mangiapane, Macomb Township, MI (US)

(73) Assignee: Zephyros, Inc., Romeo, MI (US)

( * ) Notice: Subject to any disclaimer, the term of this patent is extended or adjusted under 35 U.S.C. 154(b) by 77 days.

(21) Appl. No.: 11/863,929

(22) Filed: Sep. 28, 2007

(65) Prior Publication Data

US 2009/0085379 A1   Apr. 2, 2009

(51) Int. Cl.
*B60R 27/00* (2006.01)
(52) U.S. Cl. ............... 296/193.06; 296/203.03; 296/187.12; 296/187.02
(58) Field of Classification Search ............ 296/187.01, 296/187.02, 187.12, 193.06, 203.03, 187.03, 296/187.06, 203.01, 193.01, 202, 205
See application file for complete search history.

(56) References Cited

U.S. PATENT DOCUMENTS

| | | | |
|---|---|---|---|
| 4,901,500 A | 2/1990 | Wycech | |
| 5,506,025 A | 4/1996 | Otto | |
| 5,575,526 A | 11/1996 | Wycech | |
| 5,755,486 A | 5/1998 | Wycech | |
| 5,766,719 A | 6/1998 | Rimkus | |
| 5,932,680 A | 8/1999 | Heider | |
| 6,131,897 A | 10/2000 | Barz | |
| 6,165,588 A | 12/2000 | Wycech | |
| 6,168,226 B1 | 1/2001 | Wycech | |
| 6,207,244 B1 | 3/2001 | Hesch | |
| 6,341,467 B1 | 1/2002 | Wycech | |
| 6,419,305 B1 * | 7/2002 | Larsen ................ 296/203.03 |
| 6,467,834 B1 | 10/2002 | Barz | |
| 6,471,285 B1 | 10/2002 | Czaplicki | |
| 6,478,367 B2 | 11/2002 | Ishikawa | |
| 6,519,854 B2 * | 2/2003 | Blank ..................... 29/897.1 |
| 6,523,884 B2 * | 2/2003 | Czaplicki et al. ....... 296/187.03 |
| 6,546,693 B2 | 4/2003 | Wycech | |
| 6,550,847 B2 | 4/2003 | Honda | |
| 6,607,239 B1 * | 8/2003 | Fuji ..................... 296/203.03 |
| 6,619,727 B1 * | 9/2003 | Barz et al. ............. 296/187.02 |
| 6,729,425 B2 | 5/2004 | Schneider | |
| 6,777,049 B2 | 8/2004 | Sheldon | |
| 6,786,533 B2 * | 9/2004 | Bock et al. ............. 296/187.02 |
| 6,793,274 B2 * | 9/2004 | Riley et al. ............. 296/187.03 |
| 6,880,657 B2 | 4/2005 | Schneider | |
| 6,890,021 B2 * | 5/2005 | Bock et al. ............. 296/187.02 |
| 6,905,745 B2 | 6/2005 | Sheldon | |
| 6,921,130 B2 | 7/2005 | Barz | |
| 6,932,421 B2 | 8/2005 | Barz | |
| 6,938,947 B2 * | 9/2005 | Barz et al. ............. 296/187.02 |

(Continued)

FOREIGN PATENT DOCUMENTS

DE   19858903 A1   6/2000

(Continued)

*Primary Examiner*—Patricia L Engle
*Assistant Examiner*—Pinel E Romain
(74) *Attorney, Agent, or Firm*—Dobrusin & Thennisch PC

(57) ABSTRACT

A reinforcement member and reinforcement system for an article of manufacture (e.g., an automotive vehicle) are disclosed. The reinforcement member includes a carrier member and a reinforcement material and the carrier member includes one or multiple portions. The one portion or at least one of the multiples portions includes a reinforced portion that is divided into multiple sections.

18 Claims, 4 Drawing Sheets

U.S. PATENT DOCUMENTS

| | | |
|---|---|---|
| 6,941,719 B2 * | 9/2005 | Busseuil et al. ............... 52/846 |
| 6,953,219 B2 * | 10/2005 | Lutz et al. .............. 296/187.02 |
| 6,988,763 B2 * | 1/2006 | Saeki .................... 296/187.12 |
| 7,025,409 B2 | 4/2006 | Riley |
| 7,105,112 B2 | 9/2006 | Czaplicki |
| 7,111,899 B2 | 9/2006 | Gray |
| 7,114,763 B2 | 10/2006 | Riley |
| 7,125,461 B2 | 10/2006 | Czaplicki |
| 7,152,914 B2 * | 12/2006 | Dingman et al. ....... 296/193.05 |
| 7,160,491 B2 | 1/2007 | Barz |
| 7,255,388 B2 | 8/2007 | Le Gall |
| 7,374,219 B2 | 5/2008 | Brennecke |
| 7,401,846 B2 * | 7/2008 | Browne et al. ......... 296/187.02 |
| 2002/0033617 A1 * | 3/2002 | Blank ........................ 296/187 |
| 2002/0033618 A1 | 3/2002 | Kwon |
| 2002/0053179 A1 | 5/2002 | Wycech |
| 2002/0074827 A1 | 6/2002 | Fitzgerald |
| 2002/0190541 A1 * | 12/2002 | Czaplicki et al. ............ 296/188 |
| 2004/0026960 A1 * | 2/2004 | Czaplicki et al. ....... 296/187.02 |
| 2004/0130185 A1 | 7/2004 | Hasler |
| 2005/0212332 A1 | 9/2005 | Sheldon |
| 2005/0276970 A1 | 12/2005 | Busseuil |
| 2006/0006695 A1 | 1/2006 | Lutz |
| 2007/0075569 A1 | 4/2007 | Barz |
| 2007/0080559 A1 | 4/2007 | Stolarski |
| 2007/0090666 A1 | 4/2007 | Brennecke |
| 2007/0122510 A1 | 5/2007 | Mendiboure |
| 2008/0023987 A1 | 1/2008 | Schneider |
| 2008/0029200 A1 | 2/2008 | Sheasley |
| 2008/0143143 A1 | 6/2008 | Brennecke |
| 2008/0150323 A1 | 6/2008 | Stratman |
| 2009/0167054 A1 | 7/2009 | Niezur et al. |

FOREIGN PATENT DOCUMENTS

| | | |
|---|---|---|
| EP | 1084816 A2 | 3/2001 |
| EP | 1157916 A2 | 11/2001 |
| EP | 1256512 A2 | 11/2002 |
| EP | 1373055 A1 | 1/2004 |
| EP | 1475295 A2 | 11/2004 |
| EP | 1555191 A1 | 7/2005 |
| FR | 2749263 A1 | 12/1997 |
| GB | 2375328 A | 11/2002 |
| GB | 2421478 A | 6/2006 |
| JP | 2001199362 A | 7/2001 |
| JP | 2002362412 A | 12/2002 |
| WO | 9532110 A1 | 11/1995 |
| WO | 9743501 A1 | 11/1997 |
| WO | 0037302 A1 | 6/2000 |
| WO | 0158741 A1 | 8/2001 |
| WO | 02055923 A2 | 7/2002 |
| WO | 02074609 A1 | 9/2002 |
| WO | 2008014250 A1 | 1/2008 |
| WO | 2009080814 A1 | 7/2009 |

\* cited by examiner

REINFORCEMENT SYSTEM FOR AN AUTOMOTIVE VEHICLE

TECHNICAL FIELD

The present invention pertains to structural reinforcement of automotive vehicles and more specifically to vehicle structures reinforcement with a rigid carrier and thermally expanded material.

BACKGROUND

It is known to structurally reinforce automotive vehicles by placing inserts into cavities defined in a vehicle body structure. Rigid carriers have a thermally expandable material carried thereon, which is expanded during exposure to heat in an automotive coating processing oven (e.g., an e-coat, clearcoat or paint bake oven).

Today's automotive vehicle designers face a number of challenges in building lightweight vehicle bodies that must resist deformation when loaded, such as in an impact situation. Advanced computing and fabricating technologies allow designers to create body designs with complex geometries that previously were impractical to fabricate on a large production scale. Further, many modern vehicle designs undergo considerable computer modeling before building and testing the vehicles to withstand loading from impacts. As a result, it has become necessary for vehicles to be retrofitted with custom inserts that are capable of improving the ability of the vehicle design to withstand impact.

One problem that arises with the use of some existing reinforcement structures is that they require complete sealing about their peripheries in order to achieve structural reinforcement. This unfortunately blocks the flow of coating materials such as e-coat, and could result in uneven coating coverage. Also, with some structures, the expandable materials are concentrated within plate structures and pose a problem when the expandable material expands. The pressure of the material during expansion, due to a high localized concentration can result in read-through effects, by which the location of the expansion deforms opposing sheet metal. It is also a problem with some parts that a large amount of expandable material is required, adding undesired weight to the part.

As another problem, these reinforcements are often located within cavities of structures where those cavities tend to have cross-sections that change along their lengths or other dimensions. As such, it can be difficult to design reinforcement members that correspond to the shape of those cavities while maintaining desired amounts of rigidity at the various locations along the length or other dimensions of the cavities or members.

The present invention addresses the one or more of the above problems, and represents an improvement to existing vehicle structural reinforcement.

SUMMARY OF THE INVENTION

Accordingly, a reinforcement system for an automotive vehicle is provided. The reinforcement system typically includes a carrier member with reinforcement material disposed thereon. The carrier member includes at least one portion extending along a length of the carrier member. The at least one portion forms at least one outwardly facing surface and includes a plurality of ribs. The at least one portion forms a reinforced portion along a length of the at least one portion, the reinforced portion including a first section and a second section. Each of the first section and the second section include an outwardly facing surface and a plurality of rib. The reinforcement material is disposed upon the carrier member for forming a reinforcement member. The reinforcement material is disposed upon the at least one outwardly facing surface of the at least one portion and upon the outwardly facing surface of the first section and the outwardly facing surface of the second section. The reinforcement member has a shape that corresponds to a cavity of a structure of a vehicle. The reinforcement member typically leaves small clearances between surfaces defining the cavity of the structure and the reinforcement member upon location of the reinforcement member in the cavity of the structure.

DETAILED DESCRIPTION OF THE PREFERRED EMBODIMENT

Generally, the reinforcement system of the present invention includes a reinforcement member that is comprised of a carrier member and a reinforcement material disposed upon the carrier member. The carrier member typically includes at least one portion that forms a reinforced portion along a dimension (e.g., a length) of the at least one portion. Advantageously, the reinforced portion can provide the carrier member, the reinforcement member or both with localized strength that would otherwise be absent without the reinforced portion. Alternatively or additionally, the reinforced portion can assist the carrier member or a portion thereof in enlarging one or more dimensions thereof.

The Carrier Member

Figures 1A, 1B, 1C:
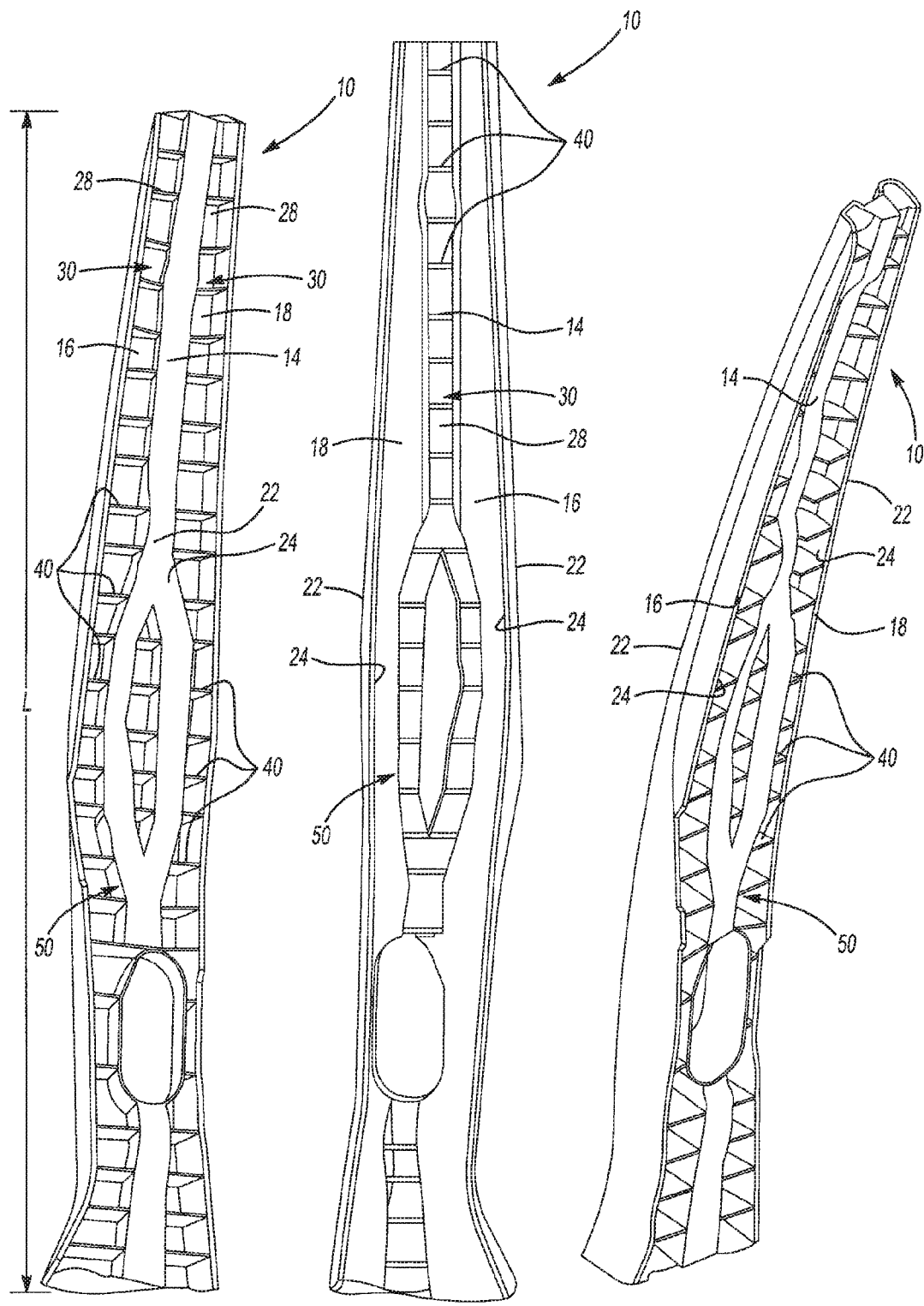
FIGS. 1A-1C respectively show a front view, a rear view and a perspective view of an exemplary carrier member in accordance with an aspect of the present invention.

With reference to FIGS. 1A-1C, there is illustrated an exemplary carrier member 10 for a reinforcement member and/or system of the present invention. In the embodiment shown, the carrier member 10 includes a first portion 14, a second portion 16 and a third portion 18 extending along a length (L) of the carrier member 10. However, it is contemplated that the reinforcement member may include fewer (e.g., 2 or even 1) or greater (e.g., 4, 5, 6 or more) portions extending along a dimension such as the length of the carrier member.

The first portion 14 is shown as being at least partially and substantially entirely located between the second portion 16 and the third portion 18. However, these portions may be rearranged when there are three portions and are typically rearranged when there are more or less than three portions.

Each of the illustrated portions 14, 16, 18 includes a wall 22, particularly a wrap-around wall that forms an outwardly facing surface 24 on one side of the wall and an inner surface 28 defining a cavity 30 on the other side of the wall 22. Each wall 22, surface 24, 28 and cavity 30 are shown as being substantially co-extensive with its respective portion, each other or both along the length of the carrier member 10. Also, in the particular embodiment shown, the cavity 30 of the first portion 14 opens to and/or is exposed at a first side of the carrier member 10. The cavities 30 of the second portion 16 and third portion 18, however, open to and/or are exposed at a second side of the carrier member 10 that is opposite the first side.

Each of the portions 14, 16, 18 includes a plurality of ribs 40 at least partially or substantially entirely disposed within the cavities 30 of the portions 14, 16, 18. The ribs 40 are illustrated as extending transverse and/or substantially perpendicular (i.e., within 20 or 10 degrees of perpendicular) to the length of the carrier member 10, although they may be otherwise disposed unless otherwise specified. The ribs 40 are also illustrated as being in spaced apart opposing relationship to each other along the length (L) of the carrier member 10. It is contemplated, however, that additional or alternative ribs may be includes in the member 10 and those ribs may intersect with other ribs.

The ribs 40 of the first portion 14 are illustrated as extending between portions of the wrap-around wall 22 of the first portion 14. The ribs 40 of the second and third portions 16, 18, however, extend between portions of their wrap-around walls 22 as well as extending between their own wrap around walls 22 and the wrap-around wall 22 of the first portion 14. Of course, the invention is not to be limited to such configuration unless otherwise stated.

At least one portion of the carrier member of the present invention typically includes a reinforced portion. As used herein, a reinforced portion of the carrier member is a portion that is configured as part of any of the main portions (e.g., the first, second and third portions 12, 16, 18) of carrier member and is divided into sections for creating a region of higher strength and/or for creating a region of the carrier member and/or main portion having greater size and/or dimension (e.g., greater diameter, width and/or cross-sectional area) or both.

Figure 2C:
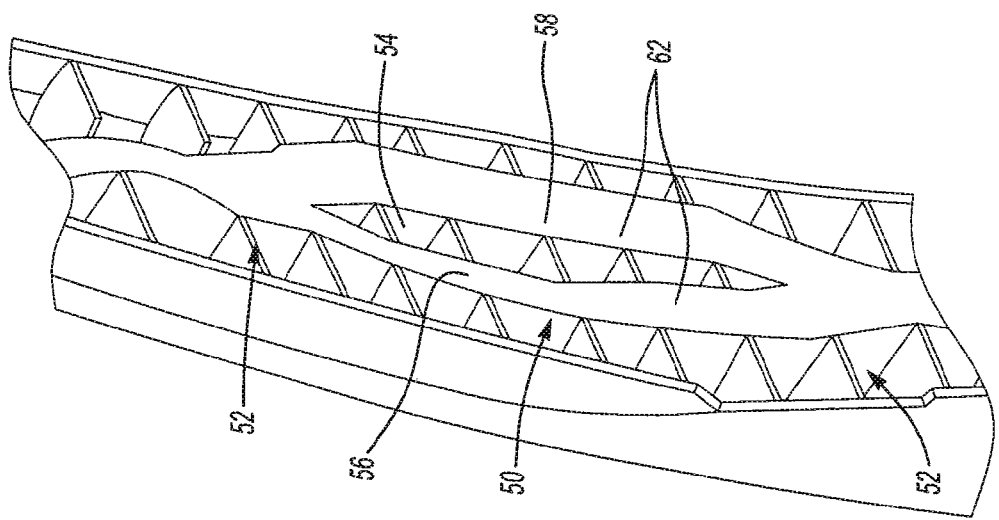
FIGS. 2A-2C respectively show a front view, a rear view and a perspective view of an exemplary reinforced portion in accordance with an aspect of the present invention.
Figure 2B:
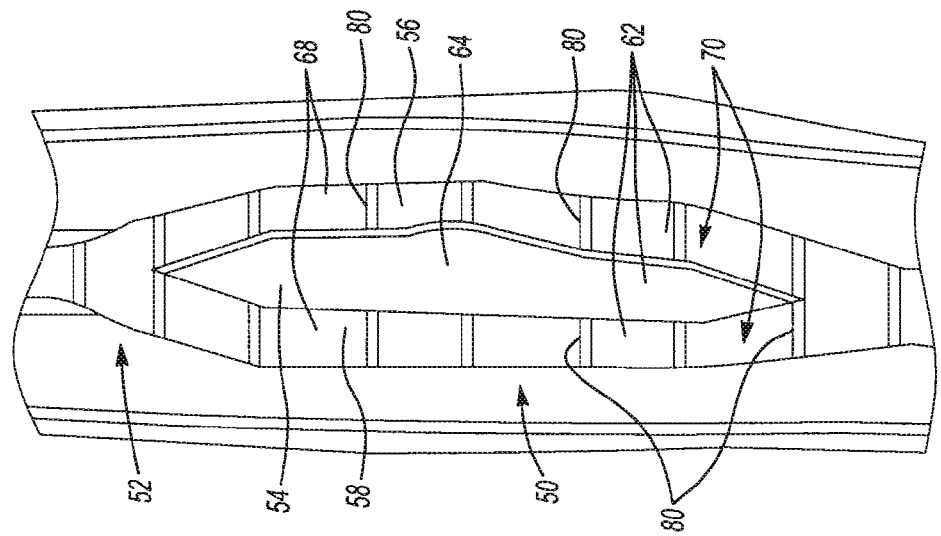
Figure 2A:
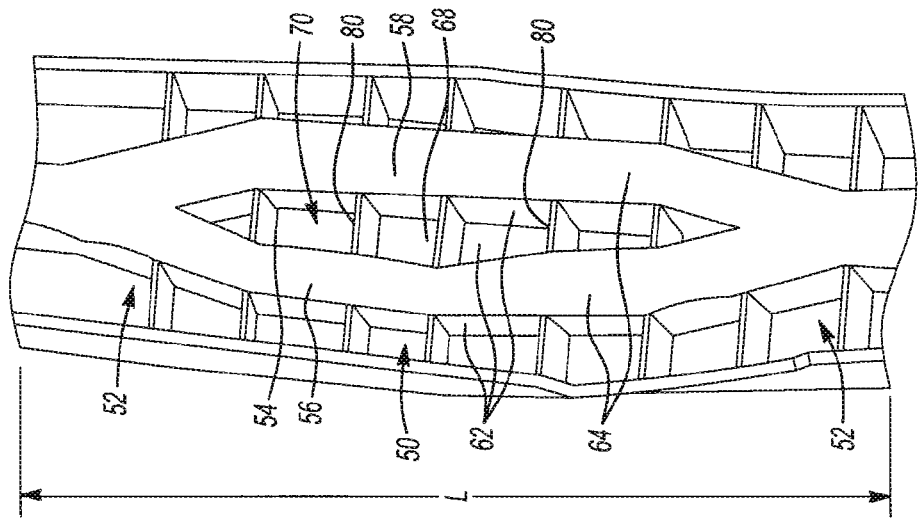

As an example, the first portion 14 of the carrier member 10 of FIGS. 1A-1C includes a reinforced portion 50 that is divided into a plurality of sections. For enhanced detail, the reinforced portion is magnified and shown in FIG. 2A-2C In forming the reinforced portion 50, the first portion 14 diverges at first and second start points 52 such that the reinforced portion 50 forms a region of the carrier member 10 and/or the first portion 14 having greater size (e.g., greater diameter, width and/or cross-sectional area). In the embodiment shown, the reinforced portion 50 includes a first section 54, a second section 56 and a third section 58 extending along the length (L) of the carrier member 10 and/or a length (L$_1$) of the reinforced portion 50. While the illustrated embodiment shows three sections, it is contemplated that the reinforcement member may include fewer (e.g., 2 or even 1) or greater (e.g., 4, 5, 6 or more) portions extending along a dimension such as the length of the carrier member or reinforced portion.

The first section 54 is shown as being at least partially and substantially entirely located between the second section 56 and the third section 58. However, these sections may be rearranged when there are three portions and are typically rearranged when there are more or less than three portions.

Each of the illustrated sections 54, 56, 58 includes a wall 62, particularly a wrap-around wall, that forms an outwardly facing surface 64 on one side of the wall and an inner surface 68 defining a cavity 70 on the other side of the wall 62. Each wall 62, surface 64, 68 and cavity 70 are shown as being substantially co-extensive with its respective section, each other or both along the length of the reinforced portion 50. Also, in the particular embodiment shown, the cavity 70 of the first section 54 opens to and/or is exposed at the second side of the carrier member 10, the reinforced portion 50 or both. The cavities 70 of the second section 56 and third section 58, however, open to and/or are exposed at the first side of the carrier member 10, the reinforced portion 50 or both that is opposite the second side.

Each of the sections 54, 56, 58 includes a plurality of ribs 80 at least partially or substantially entirely disposed within the cavities 70 of the sections 54, 56, 58. The ribs 80 are illustrated as extending transverse and/or substantially perpendicular (i.e., within 20 or 10 degrees of perpendicular) to the length of the carrier member 10, the reinforced portion 50 or both, although they may be otherwise disposed unless otherwise specified. The ribs 80 are also illustrated as being in spaced apart opposing relationship to each other along the length (L) of the carrier member 10, the reinforced portion 50 or both. It is contemplated, however, that additional or alternative ribs may be included in the reinforced portion 50 and those ribs may intersect with other ribs.

The ribs 80 of the first section 54, the second section 56 and the third section 58 are illustrated as extending between portions of their respective wrap-around walls 62. Of course, the invention is not to be limited to such configuration unless otherwise stated.

In one embodiment, it is contemplated that the ribs, the walls or both of the sections of the reinforced portion can be thicker than ribs, walls or both of the first portion, the second portion and/or the third portions. Thus, it is contemplated that the ribs, the walls or both of the sections of the reinforced portion can be at 110%, can be at least 125% or can be at least 150% the thickness of ribs, walls or both of the first portion, the second portion and/or the third portions. The actual thickness of the ribs and walls of the portions and sections should be determined depending upon the desired degree of reinforcement and the material used for the carrier member.

The Reinforcement Member

For forming a reinforcement member, a reinforcement material is typically disposed upon surfaces (e.g., outwardly facing surface) of the carrier member. The reinforcement material can be disposed upon all or a portion of the outwardly facing surfaces of the carrier member. When a surface includes reinforcement material thereon, the reinforcement material may cover a portion of the surface or the substantial entirety (e.g., at least 80, 90 or even 95%) of the surface.

Figures 3A, 3B, 3C:
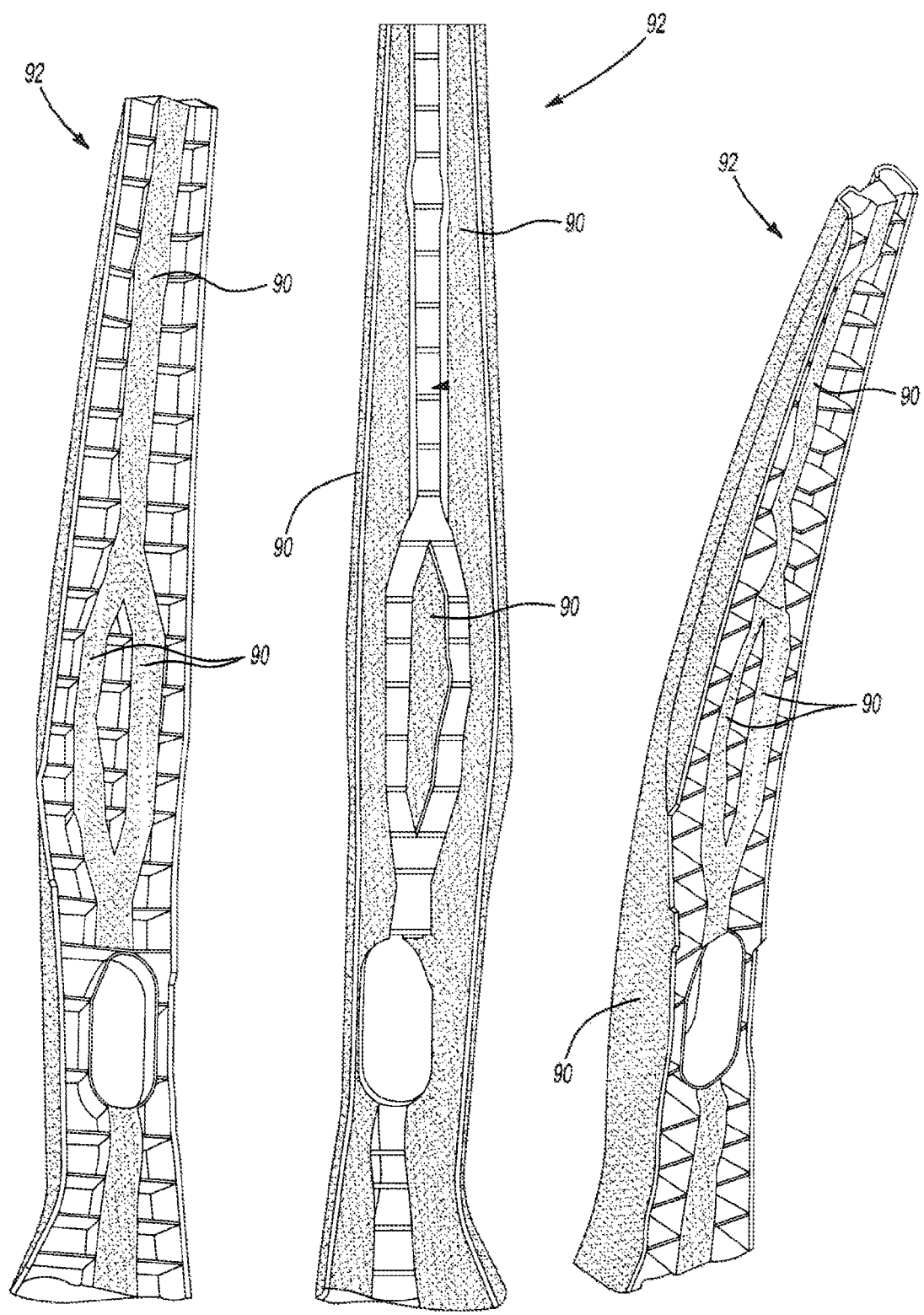
FIGS. 3A-3C respectively show a front view, a rear view and a perspective view of an exemplary reinforcement member in accordance with an aspect of the present invention.

In an exemplary embodiment shown in FIGS. 3A-3C, reinforcement material 90 has been disposed upon each of the outwardly facing surfaces 24, 64 of the carrier member 10 from FIGS. 1A-1C to form a reinforcement member 92. As shown, the reinforcement material 90 covers the substantial entirety of those surfaces of the reinforcement member.

A variety of reinforcement materials can be used for the reinforcement member of the present invention. Preferably, the reinforcement material is formed of a heat activated material that is configured to flow, cure (e.g., be thermosettable), foam and/or expand, or a combination thereof upon exposure to heat. The reinforcement material may be generally dry to the touch and substantially non-tacky or may be tacky and, in either situation, may be shaped in any form of desired pattern, placement, or thickness, but is preferably of substantially uniform thickness. Exemplary reinforcement materials include L-5200, L-5208, L-5220 foams available through L&L Products, Inc. of Romeo, Mich.

Though other heat-activated materials are possible, a preferred heat activated material is an expandable polymer or plastic, and preferably one that is foamable. Particularly preferred materials are an elastomer-based, epoxy-based, acrylate-based or acetate-based foams. For example, and without limitation, the reinforcement material may be an epoxy-based heat foamable material that can include additional polymeric materials such as core/shell polymer, thermoplastic epoxy resin, combinations thereof or the like. One exemplary material is disclosed in commonly owned copending patent application Ser. No. 11/757,499, filed Jun. 4, 2007, titled TOUGHENED ACTIVATABLE MATERIAL FOR SEALING, BAFFLING OR REINFORCING AND METHOD OF FORMING SAME and incorporated herein by reference in its entirety for all purposes.

A number of epoxy-based or otherwise based foams are known in the art and may employed in the present invention. A typical foam includes a polymeric base material, such as an epoxy resin or ethylene-based polymer which, when compounded with appropriate ingredients (typically a blowing and curing agent), expands and cures in a reliable and predicable manner upon the application of heat or the occurrence of a particular ambient condition. From a chemical standpoint for a thermally-activated material, the structural foam is usually initially processed as a flowable thermoplastic material before curing. Upon curing, it will cross-link and/or thermoset which makes the material incapable of further flow.

One advantage of the preferred structural foam materials over prior art materials is that the preferred materials can be processed in several ways. The preferred materials can be processed by injection molding (e.g., overmolding), extrusion, compression molding or with a mini-applicator. This enables the formation and creation of part designs that exceed the capability of most prior art materials.

One example of an expandable material is the epoxy based resin disclosed in U.S. Pat. No. 6,131,897, the teachings of which are incorporated herein by reference. Some other possible materials include, but are not limited to, polyolefin materials, copolymers and terpolymers with at least one monomer type an alpha-olefin, phenol/formaldehyde materials, phenoxy materials, thermoplastic materials, and polyurethane materials. See also, U.S. Pat. Nos. 5,766,719; 5,755, 486; 5,575,526; and 5,932,680, (incorporated by reference).

Other exemplary expandable materials can include combinations of two or more of the following: epoxy resin, polystyrene, styrene butadiene-styrene (SBS) block copolymer, butadiene acrylo-nitrile rubber, amorphous silica, glass microspheres, azodicarbonamide, urea, dicyandiamide. Examples of such materials are sold under the tradename SIKAELASTOMER, SIKAREINFORCER and SIKABAFFLE and are commercially available from the Sika Corporation, Madison Heights, Mich.

In applications where the reinforcement material is a heat activated, thermally expanding material, an important consideration involved with the selection and formulation of the material comprising the foam is the temperature at which a material reaction or expansion, and possibly curing, will take place. Typically, the foam becomes reactive or activated at higher processing temperatures, such as those encountered in an automobile assembly plant, when the foam is processed along with the automobile components at the elevated temperatures or at higher applied energy levels, during automotive coating processing (e.g., during paint, primer or e-coat baking or curing steps). While such temperatures encountered in an automobile assembly operation may be in the range of about 148.89° C. to 204.44° C. (about 300° F. to 400° F.), body and paint shop applications are commonly about 93.33° C. (about 200° F.) or higher. If needed, blowing agent activators can be incorporated into the composition to cause expansion at different temperatures outside the above ranges. Generally, suitable expandable foams have a volumetric range of expansion ranging from approximately 0 to over 1000 percent (e.g., the reinforcement material expands to a volume that is between 101% and 300% or 500% of the original unexpanded volume of the material).

In the embodiment illustrated, the carrier member including the walls and the ribs are all integrally molded (e.g., injection molded) or formed of single material that is different from the reinforcement material. Suitable materials can include for example, and without limitation, metal or a polymeric material (e.g., nylon, polyamide, polyester, polypropylene, polyethylene, molding compound or others) which may be filled or unfilled (e.g., filled with glass or kevlar reinforcement fibers).

Application

It is generally contemplated that a reinforcement member of the present application can be employed to reinforce various different articles of manufacture. However, it is has been found quite suitable for reinforcement of structures of automotive vehicles such as pillars, frame members, rails (roof or lower rails), rockers, combinations thereof or the like.

For formation of a reinforced structure or reinforced system, the reinforcement member of the present invention is typically located within a cavity of a structure of an automotive vehicle and the reinforcement material is then activated to adhere to the walls of the structure defining the cavity and further adhere to the carrier member of the reinforcement. The shape of the reinforcement member typically substantially corresponds to the shape of the cavity into which it is inserted. Upon location within the cavity, it is preferable for relatively small clearances (i.e., clearances between about 1 millimeter and about 5 cm) to exist between the inner walls or surface of the structure and the extremities of the reinforcement material. This keeps the reinforcement material close to the surfaces or walls of the structure while still allowing, for example, e-coat to flow through the clearances. In one embodiment, these clearances are maintained and, at the same time, at least 70%, more typically at least 85% and even possibly at least 90% of the reinforcement material is within less than 15 cm, more typically less than 10 cm and even more typically less than 5 cm of the walls and/or surfaces defining the cavity of the structure into which the reinforcement member has been located.

The reinforcement member may be held in place in the structure according to various techniques prior to activation of the reinforcement material. For example, fasteners, friction fits or other structures may be employed to assist in maintaining the reinforcement member in place prior to activation of the reinforcement material. Alternatively, the reinforcement member may be shaped or located within a structure such that it is naturally held in place by an interference fit, by a lower support of the structure or the like.

Figure 4:
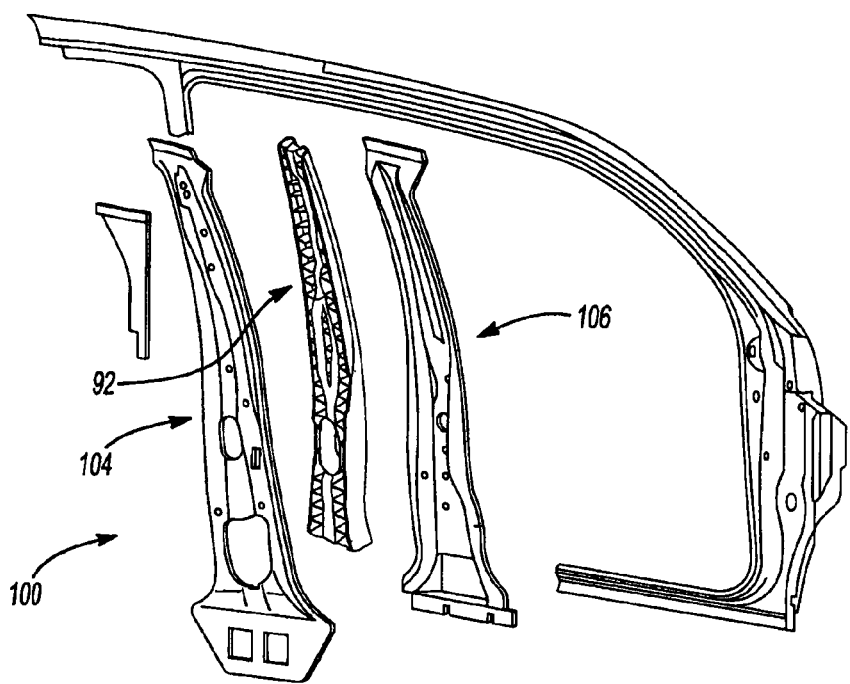
FIGS. 4-5 illustrate the reinforcement member of FIGS. 3A-3C being applied to a structure of an automotive vehicle.
Figure 5:
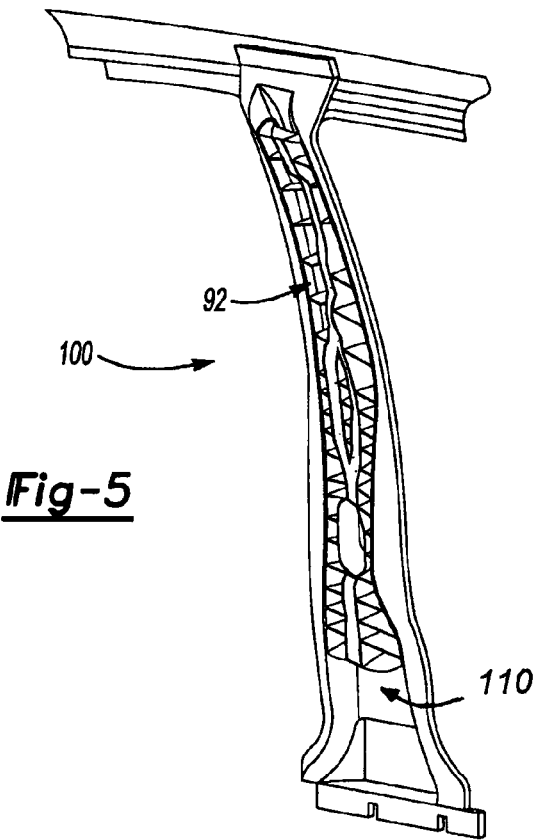

With reference to FIGS. 4-5, the reinforcement member 92 is being located with a pillar structure 100 of an automotive vehicle. The particular pillar structure 100 being shown is a B-pillar (e.g., a pillar adjacent and/or nearest the front seat back of a driver or passenger seat of a vehicle), but could be an A-pillar, a C-pillar or a D-pillar or any of the other structures discussed herein or otherwise, unless otherwise specified.

In the particular embodiment shown, the reinforcement member 92 is located in the pillar structure 100 by locating the reinforcement member 92 adjacent a first panel 104 of the structure 100 and then attaching (e.g., welding or otherwise attaching) a second panel 106 to the first panel 104 to form the structure 100 and locate the reinforcement member 92 within a cavity 110 of the structure 100.

In the embodiment shown, the reinforcement member 92 extends along substantially the entirety (e.g., at least 70%, 80%, 90% or more) of a length of the structure 100. Thus, it extends substantially from the top to the bottom of the pillar. While this it particularly desirable in certain circumstances, it is also contemplated that the reinforcement member may extends only a portion of the length or other dimension of a given structure.

It is noted that the reinforcement member, particularly the carrier member, can be designed with one or more openings (e.g., through-holes) for allowing passage of entities (e.g., wires or otherwise) therethrough. Such an opening is shown in the illustrated embodiment and, as is also shown, that opening corresponds to an opening in at least one of the walls of the structure into which the reinforcement is inserted.

Advantageously, the reinforced portion of the carrier member can provide additional strength relative to the strength that would have been present without the portion. Additionally or alternatively, the reinforced portion can provide expanded diameter, width or otherwise to allow better shape correspondence of the reinforcement member to the cavity.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed:

1. A reinforcement system for an automotive vehicle, the reinforcement comprising:
    a carrier member that is configured to extend the height of a vehicle that includes a wrap around wall extending the entire length of the carrier and at least one portion extending along a length of the carrier member, wherein:
    i. the at least one portion forms at least one outwardly facing surface and includes a plurality of ribs; and
    ii. the at least one portion forms a reinforced portion along a length of the at least one portion, the reinforced portion including a first section and a second section, each of the first section and the second section extending generally parallel to one another and generally parallel to the length of the at least one portion and including an outwardly facing surface and a plurality of ribs;
    a reinforcement material disposed upon the carrier member for forming a reinforcement member, the reinforcement material being disposed upon the at least one outwardly facing surface of the at least one portion and upon the outwardly facing surface of the first section and the outwardly facing surface of the second section, wherein:
    i. the reinforcement member has a shape that corresponds to a cavity of a structure of a vehicle; and
    ii. the reinforcement member leaves small clearances between surfaces defining the cavity of the structure and the reinforcement member upon location of the reinforcement member in the cavity of the structure.

2. A reinforcement system as in claim 1 wherein the at least one portion includes a first portion, a second portion and a third portion and wherein the first portion forms the reinforced portion.

3. A reinforcement system as in claim 2 wherein the first portion is located between the second portion and the third portion.

4. A reinforcement system as in claim 1 wherein the plurality of ribs of the reinforced portion are thicker than the plurality of ribs of the rest of the at least one portion.

5. A reinforcement system as in claim 1 wherein the carrier member is formed of an injection molded plastic that includes polyamide.

6. A reinforcement system as in claim 1 wherein the reinforced portion includes a third section and each of the first section, the second section and the third section include a wrap-around wall.

7. A reinforcement system as in claim 6 wherein each of the first section, the second section and the third second include at least 3 transversely extending ribs.

8. A reinforcement system as in claim 1 wherein the structure of the automotive vehicle is a pillar of the vehicle.

9. A reinforcement system as in claim 8 wherein the pillar is a B-pillar.

10. A reinforcement system as in claim 1 wherein the carrier member defines a through-hole extending therethrough.

11. A reinforcement system as in claim 1 wherein the carrier member is larger in diameter at the reinforced portion relative to the diameter of the carrier member at the rest of the first portion.

12. A reinforcement system for an automotive vehicle, the reinforcement comprising:
    a carrier member having a length and including a first portion, a second portion and a third portion each having a wrap around wall extending along the entire length of the carrier member, wherein:
    i. the first portion, the second portion and the third portion each form at least one outwardly facing surface and include a plurality of ribs; and
    ii. the first portion forms a reinforced portion along a length of the at least one portion, the reinforced portion including a first section, a second section and a third section, each of the first section, the second section and the third section extending generally parallel to one another and generally parallel to the length of the first portion and including an outwardly facing surface and a plurality of ribs;
    iii. the first portion diverges from one path to two diverging paths at first and second start points located at opposing ends of the first portion;
    iv. the third portion includes at least one cut-out section adjacent to one or more of the first and second start points;
    a reinforcement material disposed upon the carrier member for forming a reinforcement member, the reinforcement material being disposed upon the outwardly facing surfaces of the first portion, the second portion and the third portion and upon the outwardly facing surfaces of the first section and the second section, wherein:
    i. the reinforcement member has a shape that corresponds to a cavity of a pillar structure of a vehicle; and
    ii. the reinforcement member leaves small clearances between surfaces defining the cavity of the pillar structure and the reinforcement member upon location of the reinforcement member in the cavity of the structure.

13. A reinforcement system as in claim 12 wherein the first portion is located substantially entirely between the second portion and the third portion.

14. A reinforcement system as in claim 12 wherein the first section is located substantially entirely between the second section and the third section.

15. A reinforcement system as in claim 12 wherein the plurality of ribs of the sections of the reinforced portion are thicker than the plurality of ribs of the second portion and the third portion.

16. A reinforcement system as in claim 12 wherein each of the first section the second section and the third section include a wrap-around wall and wherein each of the first section, the second section and the third second includes at least 3 transversely extending ribs.

17. A reinforcement system as in claim 12 wherein the pillar structure of the automotive vehicle is a B-pillar of the vehicle and wherein the carrier member is larger in diameter at the reinforced portion relative to the diameter of the carrier member at the rest of the first portion.

18. A reinforcement system for an automotive vehicle, the reinforcement comprising:
- a carrier member that includes a first portion, a second portion and a third portion extending along a length of the carrier member, wherein:
  - i. the first portion is between the second portion and the third portion;
  - ii. the first portion, the second portion and the third portion each include a wrap-around wall that defines a cavity on one side thereof, defines an outwardly facing surface on the other side thereof, and extends the entire length of the carrier member;
  - iii. opposing spaced apart transversely extending ribs are disposed in each cavity of each of the first portion, the second portion and the third portion;
  - iv. the first portion forms a reinforced portion along a length of the first portion, the reinforced portion defining a first section, a second section and a third section; and
  - v. each of the first section, the second section and the third section extending parallel to one another and parallel to the length of the first portion and include a wrap-around wall that defines a cavity on one side thereof and defines an outwardly facing surface on the other side thereof;
  - vi. the first portion diverges from one path to two diverging paths at a first start point and re-converges to one path at a second start point, so that the start points are located at opposing ends of the first portion;
  - vii. the third portion includes at least one cut-out section adjacent to one or more of the first and second start points;
- a reinforcement material disposed upon the carrier member for forming a reinforcement member, the reinforcement material being disposed upon the outwardly facing surfaces of the first portion, the second portion and the third portion and the reinforcement material being disposed in a substantially constant width strip along the front of the first, second, and third portion, so that the width of the reinforcement material stays consistent where the first portion diverges from one path to two diverging paths and re-converges to one path and, wherein:
  - i. the carrier member has a shape that corresponds to a cavity of a pillar of a vehicle and leaves small clearances between wall defining the cavity of the pillar and the reinforcement material upon insertion of the reinforcement member.

* * * * *

UNITED STATES PATENT AND TRADEMARK OFFICE
CERTIFICATE OF CORRECTION

| | | |
|---|---|---|
| PATENT NO. | : 7,735,906 B2 | Page 1 of 1 |
| APPLICATION NO. | : 11/863929 | |
| DATED | : June 15, 2010 | |
| INVENTOR(S) | : Ken Takahashi | |

It is certified that error appears in the above-identified patent and that said Letters Patent is hereby corrected as shown below:

Col. 9, line 12, please insert -- , -- between the word "section" and "the".

Signed and Sealed this

Twenty-first Day of September, 2010

David J. Kappos
*Director of the United States Patent and Trademark Office*